(12) United States Patent
Obayashi et al.

(10) Patent No.: US 11,487,977 B2
(45) Date of Patent: Nov. 1, 2022

(54) IMAGE FORMING APPARATUS AND IMAGE FORMING METHOD TO VERIFY TARGET IMAGE USING CORRECTED IMAGE

(71) Applicant: CANON KABUSHIKI KAISHA, Tokyo (JP)

(72) Inventors: Yosuke Obayashi, Chiba (JP); Minoru Kambegawa, Chiba (JP); Junichi Goda, Chiba (JP); Masanori Ichikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/127,638

(22) Filed: Dec. 18, 2020

(65) Prior Publication Data
US 2021/0201097 A1 Jul. 1, 2021

(30) Foreign Application Priority Data
Dec. 25, 2019 (JP) .............................. JP2019-235092

(51) Int. Cl.
*G06K 15/00* (2006.01)
*G06K 15/02* (2006.01)

(52) U.S. Cl.
CPC ......... *G06K 15/408* (2013.01); *G06K 15/027* (2013.01)

(58) Field of Classification Search
CPC ........................... G06K 15/408; G06K 15/027
USPC ............... 358/1.14, 1.15, 1.9, 534, 535, 536
See application file for complete search history.

(56) References Cited

U.S. PATENT DOCUMENTS

| | | | | |
|---|---|---|---|---|
| 2010/0149567 A1* | 6/2010 | Kanazawa | ......... | H04N 1/40006 358/1.9 |
| 2010/0157357 A1* | 6/2010 | Torikoshi | .............. | G06F 3/1291 358/1.15 |
| 2010/0309496 A1* | 12/2010 | Ido | ........................ | H04N 1/3871 358/1.9 |
| 2014/0313544 A1* | 10/2014 | Hasegawa | ............. | G06F 3/1267 358/1.15 |
| 2019/0180431 A1* | 6/2019 | Kaneko | ................ | G06V 10/993 |

FOREIGN PATENT DOCUMENTS

JP 2015223717 A 12/2015

* cited by examiner

*Primary Examiner* — Quang N Vo
(74) *Attorney, Agent, or Firm* — Canon U.S.A., Inc. IP Division

(57) ABSTRACT

A correct image and print settings are registered in association with each other, the registered correct image is selected based on print settings of a verification target image, and verification is performed by comparing the verification target image with the selected correct image.

19 Claims, 8 Drawing Sheets

| ID | IMAGE ID | PRINTER ID | MEDIUM SETTING | SCREEN SETTING | COLOR SETTING | RESOLUTION SETTING | CORRECT IMAGE FILE |
|---|---|---|---|---|---|---|---|
| 1 | Image A | printer1 | media1 | screen1 | profile1 | 1200 | 00001.tif |
| 2 | Image A | printer1 | media1 | screen1 | profile1 | 1200 | 00002.tif |
| 3 | Image B | printer1 | media2 | screen1 | profile1 | 1200 | 00003.tif |
| 4 | Image B | printer1 | media2 | screen1 | profile1 | 1200 | 00004.tif |
| 5 | Image A | printer1 | media3 | screen2 | profile2 | 600 | 00005.tif |
| 6 | Image B | printer1 | media3 | screen2 | profile2 | 600 | 00006.tif |

FIG.8

IMAGE FORMING APPARATUS AND IMAGE FORMING METHOD TO VERIFY TARGET IMAGE USING CORRECTED IMAGE

BACKGROUND

Technical Field

One disclosed aspect of the embodiments relates to an image forming apparatus, an image forming method, and a program.

Description of the Related Art

In recent years, there has been known a printing system in which a sheet printed by a printer can be verified by a verification device during the conveyance of the sheet. In the verification of the printed sheet, the verification device reads an image of the conveyed printed sheet and determines whether the printed sheet is normal by analyzing the read image. The verification device can detect, for example, part of a bar code or a ruled line missing, and a color shift.

As a method of generating a correct image (e.g., a master image, or a reference image) to be used for image analysis, there is known a method of reading a preprinted sheet of quality sufficient for a correct image by using a verification device, so that a correct image is acquired. The acquired correct image is stored as image data, so that the stored image data can be reused in a case where the identical print content is verified later. Work for preparing the correct image again can be omitted by reusing the stored correct image.

Japanese Patent Application Laid-Open No. 2015-223717 discusses a method of converting print image data into data in the same format as that of a read image to generate a master image, and verifying the print quality of a printed sheet, based on data representing the difference between the read image and the master image.

However, according to Japanese Patent Application Laid-Open No. 2015-223717, it is conceivable that, in a case where print settings in generating the master image and print settings in printing a verification target image are different when the master image is reused, the image quality of the master image and the image quality of the verification target image may differ even when the print contents are the same. Therefore, there is such an issue that, even when there is no image quality defect in the printed sheet of the verification target image, the printed sheet is detected as a sheet having an image quality defect.

SUMMARY

An image forming apparatus according to an embodiment includes the following configuration. The image forming apparatus includes a printing unit, a reading unit, a registration unit, a selection unit, and a verification unit. The printing unit is configured to print an image on a recording sheet. The reading unit is configured to read the image printed on the recording sheet by the printing unit. The registration unit is configured to register a verification target image printed on a recording sheet by the printing unit and read by the reading unit, as a correct image in association with print settings used in printing the verification target image. The selection unit is configured to select the correct image registered by the registration unit, based on print settings of a verification target image printed on a recording sheet by the printing unit and read by the reading unit. The verification unit is configured to perform verification by comparing the read verification target image with the correct image selected by the selection unit.

Further features of the disclosure will become apparent from the following description of exemplary embodiments with reference to the attached drawings.

DESCRIPTION I/F THE EMBODIMENTS

An exemplary embodiment of the disclosure will be described below with reference to the drawings.

In the following description, an external controller can be referred to as an image processing controller, a digital front end (DFE), or a print server. An image forming apparatus can be referred to as a multifunction machine or a multifunction peripheral (MFP).

Figure 1:
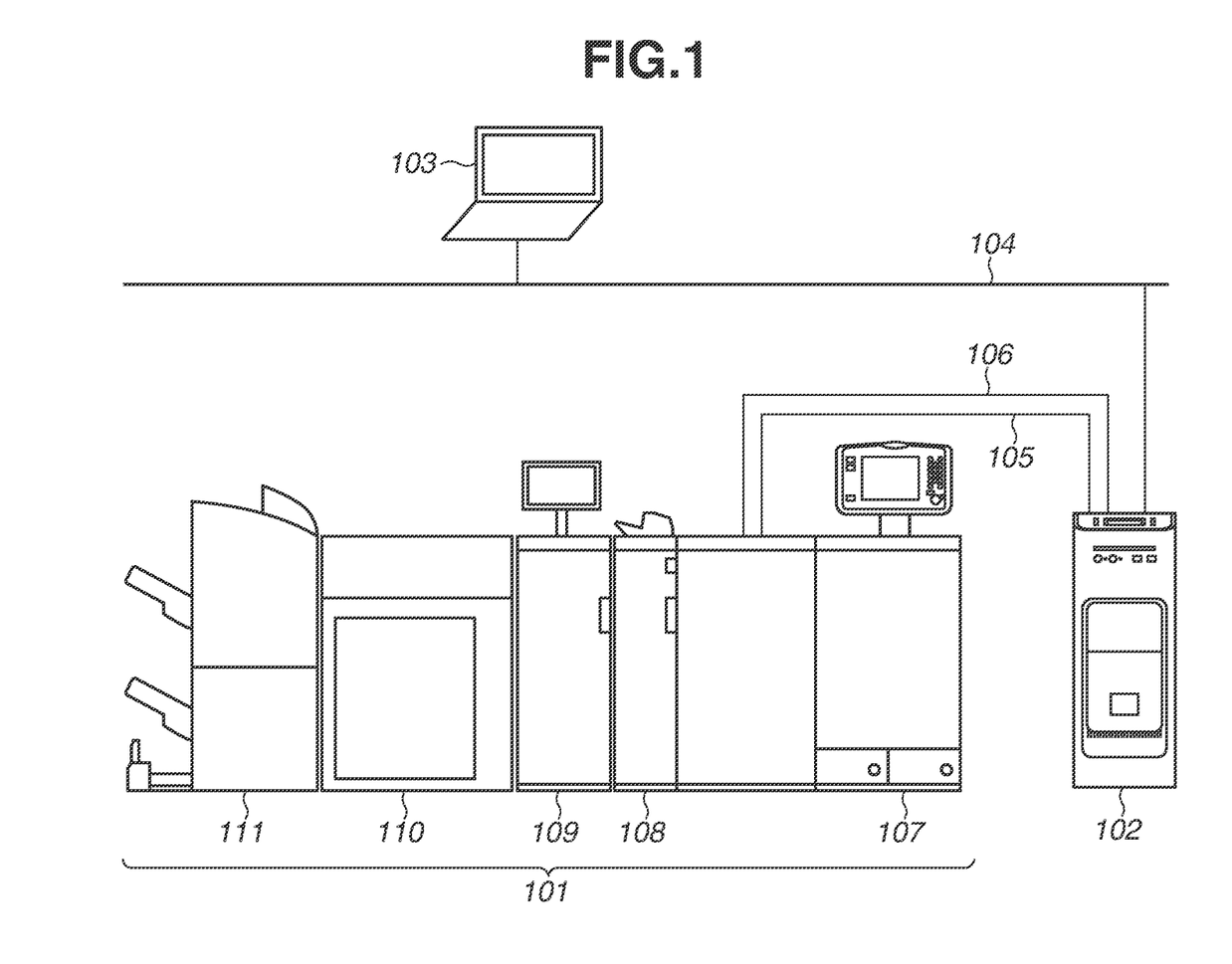
FIG. 1 is a diagram illustrating an overall hardware configuration of a printing system.

FIG. 1 is a diagram illustrating an overall hardware configuration of an image processing system according to the present exemplary embodiment. The image processing system includes an image forming apparatus 101 and an external controller 102. The image forming apparatus 101 and the external controller 102 are connected to communicate with each other via an internal local area network (LAN) 105 and a video cable 106. The external controller 102 is connected to a client personal computer (PC) 103 to communicate therewith via an external LAN 104, and the client PC 103 issues a print instruction to the external controller 102.

A printer driver having a function of converting print data into a print description language that can be processed by the external controller 102 is installed on the client PC 103. A user who intends to carry out printing can provide a print instruction from any of various applications via the printer driver. The printer driver transmits print data to the external controller 102 based on a print instruction from the user. Upon receiving the print instruction from the client PC 103, the external controller 102 performs data analysis and rasterizing processing, and inputs print data and issues a print instruction to the image forming apparatus 101.

Next, the image forming apparatus 101 will be described. The image forming apparatus 101 is an apparatus in which a plurality of devices having different functions are connected, and can perform complicated print processing such as bookbinding.

A printer 107 forms an image using toner on a sheet conveyed from a sheet feeding unit located in a lower part of the printer 107. The configuration and operation principle of the printer 107 are as follows. A light beam such as a laser beam modulated based on image data is reflected by a polygon mirror, and the reflected light beam is used as a scanning beam to irradiate a photosensitive drum. An electrostatic latent image formed on the photosensitive drum by the laser beam is developed by the toner to form a toner image, and the toner image is transferred to a sheet attached to a transfer drum. This series of image forming processes is sequentially performed for toners of yellow (Y), magenta (M), cyan (C), and black (K), so that a full color image is formed on the sheet. The sheet having the full color image formed thereon on the transfer drum is conveyed to a fixing unit. The fixing unit includes a roller and a belt, a heat source such as a halogen heater is built in the roller, and the toner on the sheet to which the toner image has been transferred is melted and fixed to the sheet by heat and pressure.

An inserter 108 is provided to insert an insertion sheet. The inserter 108 can insert the sheet between arbitrary sheets in a sheet group conveyed after being printed by the printer 107.

A verification device 109 determines whether a printed image is normal by reading an image of a conveyed sheet and comparing the read image with a correct image registered beforehand.

A large capacity stacker 110 is a stacker in which a large amount of sheets can be stacked. A finisher 111 is provided to apply finishing processing to a conveyed sheet. The finisher 111 can perform finishing such as stapling, punching, and saddle stitch bookbinding, and discharges a bound product to a sheet discharge tray after the finishing processing.

The position of each of the inserter 108 and the verification device 109 is not limited to the order illustrated in FIG. 1, and the inserter 108 may be between the verification device 109 and the large capacity stacker 110.

The printing system described with reference to FIG. 1 has a configuration in which the external controller 102 is connected to the image forming apparatus 101, but the present exemplary embodiment is not limited to the configuration in which the external controller 102 is connected. In other words, the printing system may have such a configuration that the image forming apparatus 101 is connected to the external LAN 104 and the client PC 103 transmits print data that can be processed by the image forming apparatus 101 to the image forming apparatus 101. In this case, the image forming apparatus 101 performs data analysis and rasterizing processing, and executes print processing.

Figure 2:
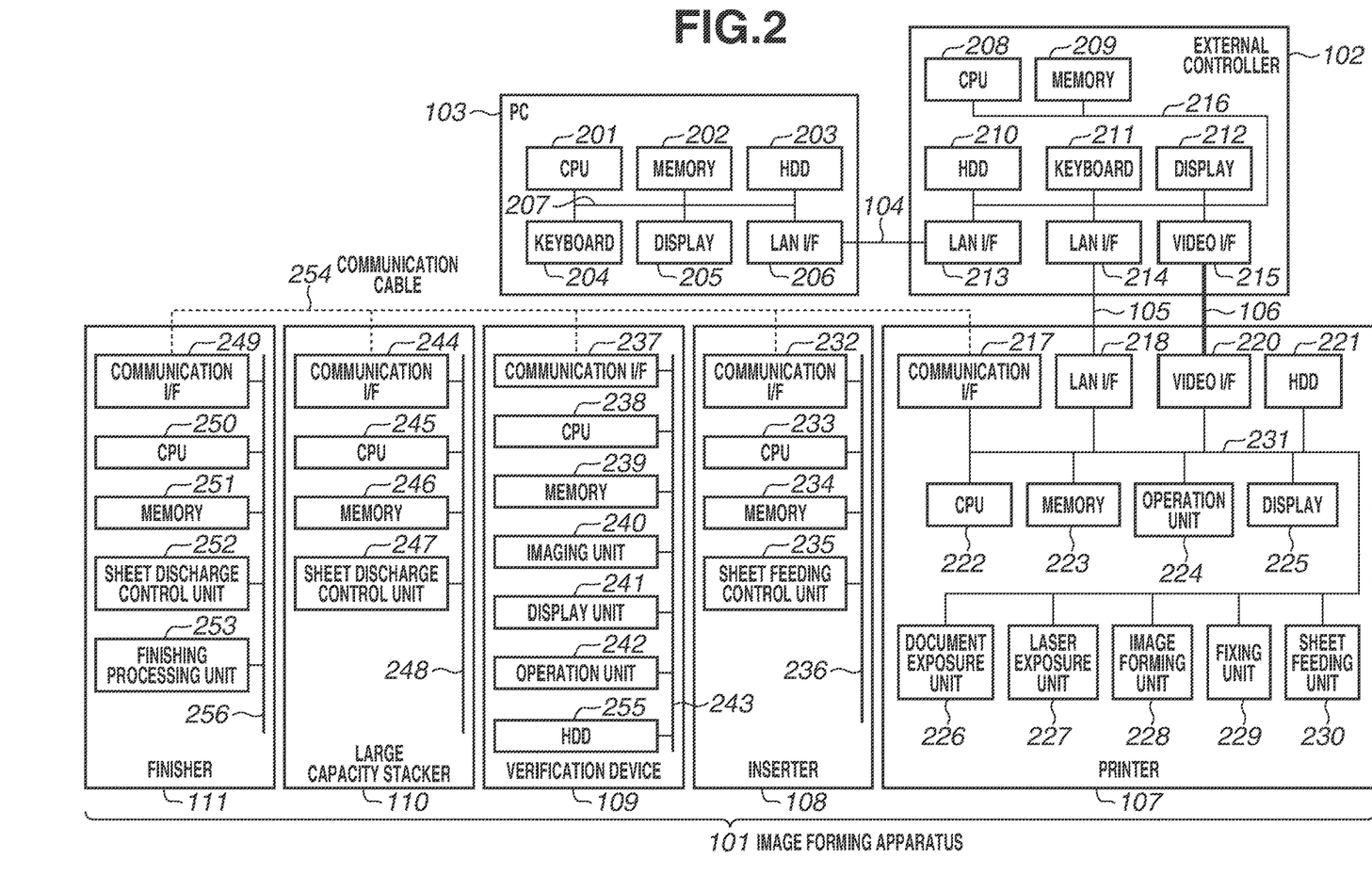
FIG. 2 is a block diagram illustrating a system configuration of the printing system.

FIG. 2 is a block diagram illustrating a system configuration of each of the image forming apparatus 101, the external controller 102, and the client PC 103.

First, the configuration of the printer 107 of the image forming apparatus 101 will be described. The printer 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printer 107 of the image forming apparatus 101 further includes a document exposure unit 226, a laser exposure unit 227, an image forming unit 228, a fixing unit 229, and a sheet feeding unit 230. These components are connected via a system bus 231.

The communication I/F 217 is connected to the inserter 108, the verification device 109, the large capacity stacker 110, and the finisher 111 via a communication cable 254 to perform communication for controlling each of these devices. The LAN I/F 218 is connected to the external controller 102 via the internal LAN 105 to perform communication of data such as print data. The video I/F 220 is connected to the external controller 102 via the video cable 106 to perform communication of data such as image data.

The HDD 221 is a storage that stores a program and data. The CPU 222 controls image processing and printing based on the program stored in the HDD 221. The memory 223 stores a program for various types of processing to be performed by the CPU 222 and image data, and operates as a work area. The operation unit 224 receives inputs of various settings and operation instructions from the user. The display 225 displays settings information of the image processing apparatus and a processing status of a print job.

The document exposure unit 226 performs processing of reading a document when a copy function or a scan function is used. The document exposure unit 226 reads document data by detecting an image using a complementary metal oxide semiconductor (CMOS) image sensor or a contact image sensor (CIS), while lighting a sheet placed by the user using an exposure lamp. The laser exposure unit 227 performs primary charging for irradiating the photosensitive drum with a laser beam to transfer a toner image, and laser exposure. In the laser exposure unit 227, first, the primary charging is performed to charge the surface of the photosensitive drum to a uniform negative electric potential. Subsequently, the photosensitive drum is irradiated with a laser beam by a laser driver while a reflection angle is adjusted by the polygon mirror. The negative electric potential of the irradiated portion is thereby neutralized, so that an electrostatic latent image is formed. The image forming unit 228 is provided to transfer the toner to a sheet, includes a developing unit, a transfer unit, and a toner replenishment unit, and transfers the toner on the photosensitive drum to the sheet. In the developing unit, the toner charged to negative is supplied from a development cylinder and attached to the electrostatic latent image on the surface of the photosensitive drum, so that the image is visualized. The transfer unit performs primary transfer in which a positive electric potential is applied to a primary transfer roller to transfer the toner on the surface of the photosensitive drum to a transfer belt, and secondary transfer in which a positive electric potential is applied to a secondary transfer external roller to transfer the toner on the transfer belt to the sheet. The fixing unit 229 is provided to melt and fix the toner to the sheet by heat and pressure, and includes a heater, a fixing belt, and a pressure belt. The sheet feeding unit 230 is provided to feed a sheet, and controls sheet feeding operation and sheet conveying operation using rollers and various sensors.

Next, the configuration of the inserter 108 of the image forming apparatus 101 will be described. The inserter 108 of the image forming apparatus 101 includes a communication I/F 232, a CPU 233, a memory 234, and a sheet feeding control unit 235, and these components are connected via a system bus 236. The communication I/F 232 is connected to the printer 107 via the communication cable 254 to perform communication for control. The CPU 233 performs various types of control for sheet feeding, based on a control program stored in the memory 234. The memory 234 stores the control program. The sheet feeding control unit 235 controls feeding and conveyance of a sheet conveyed from a sheet feeding unit of the inserter 108 and a sheet conveyed from the printer 107, while controlling rollers and sensors based on an instruction from the CPU 233.

Next, the configuration of the verification device 109 of the image forming apparatus 101 will be described. The verification device 109 of the image forming apparatus 101 includes a communication I/F 237, a CPU 238, a memory 239, an imaging unit 240, a display unit 241, an operation unit 242, and an HDD 255, and these components are connected via a system bus 243. The communication I/F 237 is connected to the printer 107 via the communication cable 254 to perform communication for control. The CPU 238 performs various types of control for verification, based on a control program stored in the memory 239. The memory 239 stores the control program. The imaging unit 240 reads an image printed on a conveyed sheet using a CIS, based on an instruction of the CPU 238. The imaging unit 240 may capture the image printed on the conveyed sheet using a camera. Further, the imaging unit 240 reads not only a printed sheet which is a verification target, but also a printed sheet to be a candidate for the correct image in the correct-image registration. As the printed sheet to be the candidate for the correct image, a plurality of copies is printed for one page. The average pixel value of the pixel values of pixels at the respective positions corresponding to each other in the respective copies is used as a pixel value of the correct image. In a case where ten copies are printed, the average pixel value of the pixel values of pixels at the respective positions corresponding to each other in the respective copies (e.g., the top-left pixels in the respective images) is used as the pixel value of the correct image. A minute variation component below verification accuracy contained in the printed sheet can be thereby eliminated as much as possible.

The CPU 238 compares the image acquired by the imaging unit 240 and the correct image stored in the memory 239 (a storage unit) to determine whether the printed image is normal. The display unit 241 displays information such as a verification result and a setting screen. The operation unit 242 is operated by the user and receives instructions for changing the settings of the verification device 109 and the registration of the correct image.

Next, the configuration of the large capacity stacker 110 of the image forming apparatus 101 will be described. The large capacity stacker 110 of the image forming apparatus 101 includes a communication I/F 244, a CPU 245, a memory 246, and a sheet discharge control unit 247, and these components are connected via a system bus 248. The communication I/F 244 is connected to the printer 107 via the communication cable 254 to perform communication for control. The CPU 245 performs various types of control for sheet discharge, based on a control program stored in the memory 246. The memory 239 stores the control program. The sheet discharge control unit 247 controls conveyance of a sheet to a stack tray, an escape tray, or the finisher 111 in a subsequent stage, based on an instruction from the CPU 245.

Next, the configuration of the finisher 111 of the image forming apparatus 101 will be described. The finisher 111 of the image forming apparatus 101 includes a communication I/F 249, a CPU 250, a memory 251, a sheet discharge control unit 252, and a finishing processing unit 253, and these components are connected via a system bus 256. The communication I/F 249 is connected to the printer 107 via the communication cable 254 to perform communication for control. The CPU 250 performs various types of control for finishing and sheet discharge, based on a control program stored in the memory 251. The memory 251 stores the control program. The sheet discharge control unit 252 controls conveyance and discharge of a sheet, based on an instruction from the CPU 250. The finishing processing unit 253 controls finishing processing such as stapling, punching, and saddle stitch bookbinding, based on an instruction from the CPU 250.

Next, the configuration of the external controller 102 will be described. The external controller 102 includes a CPU 208, a memory 209, an HDD 210, a keyboard 211, a display 212, a LAN I/F 213, a LAN I/F 214, and a video I/F 215, and these components are connected via a system bus 216. The CPU 208 executes processing such as reception of print data from the client PC 103, raster image processor (RIP) processing, and transmission of print data to the image forming apparatus 101, based on a program and data stored in the HDD 210. The memory 209 stores a program and data to be used when the CPU 208 performs various types of processing, and the memory 209 operates as a work area. The HDD 210 stores a program and data for operation such as print processing. The keyboard 211 is provided to input an operating instruction into the external controller 102. The display 212 displays information such as an application executed by the external controller 102 using video signals of a still image or a moving image. The LAN I/F 213 is connected to the client PC 103 via the external LAN 104 to perform communication of information such as a print instruction. The LAN I/F 214 is connected to the image forming apparatus 101 via the internal LAN 105 to perform communication of information such as a print instruction. The video I/F 215 is connected to the image forming apparatus 101 via the video cable 106 to perform communication of data such as print data.

Next, the configuration of the client PC 103 will be described. The client PC 103 includes a CPU 201, a memory 202, an HDD 203, a keyboard 204, a display 205, and a LAN I/F 206, and these components are connected via a system bus 207. The CPU 201 generates print data and issues a print instruction, based on a document processing program stored in the HDD 203. Further, the CPU 201 comprehensively controls each of the components connected to the system bus 207. The memory 202 stores a program and data to be used when the CPU 201 performs various types of processing, and the memory 202 operates as a work area. The HDD 203 stores a program and data for operation such as print processing. The keyboard 204 is provided to input an operating instruction into the client PC 103. The display 205 displays information such as an application executed by the client PC 103 using video signals of a still image or a moving image. The LAN I/F 206 is connected to the external LAN 104 to perform communication of information such as a print instruction.

The external controller 102 and the image forming apparatus 101 are described above to be connected by the internal LAN 105 and the video cable 106, but may be, for example, connected only by the video cable 106 if data for printing can be transmitted and received. Further, the memories 202, 209, 223, 234, 239, 246, and 251 may each be any type of storage if the storage is intended to hold data and a program. For example, a volatile random access memory (RAM), a nonvolatile read only memory (ROM), a built-in HDD, an external HDD, or a Universal Serial Bus (USB) memory may substitute for each of these memories. In general, the CPUs 201, 208, 222, 233, 245, and 250 perform operations by executing the programs stored in the respective memories 202, 209, 223, 234, 239, 246, and 251. These programs correspond to the functional units as described in the flowcharts in FIGS. 4, 5A and 5B, 6A, 6B, and 8. Examples of these functional units include a printing unit, a reading unit, a registration unit, a selection unit, and a verification unit.

Figure 3:
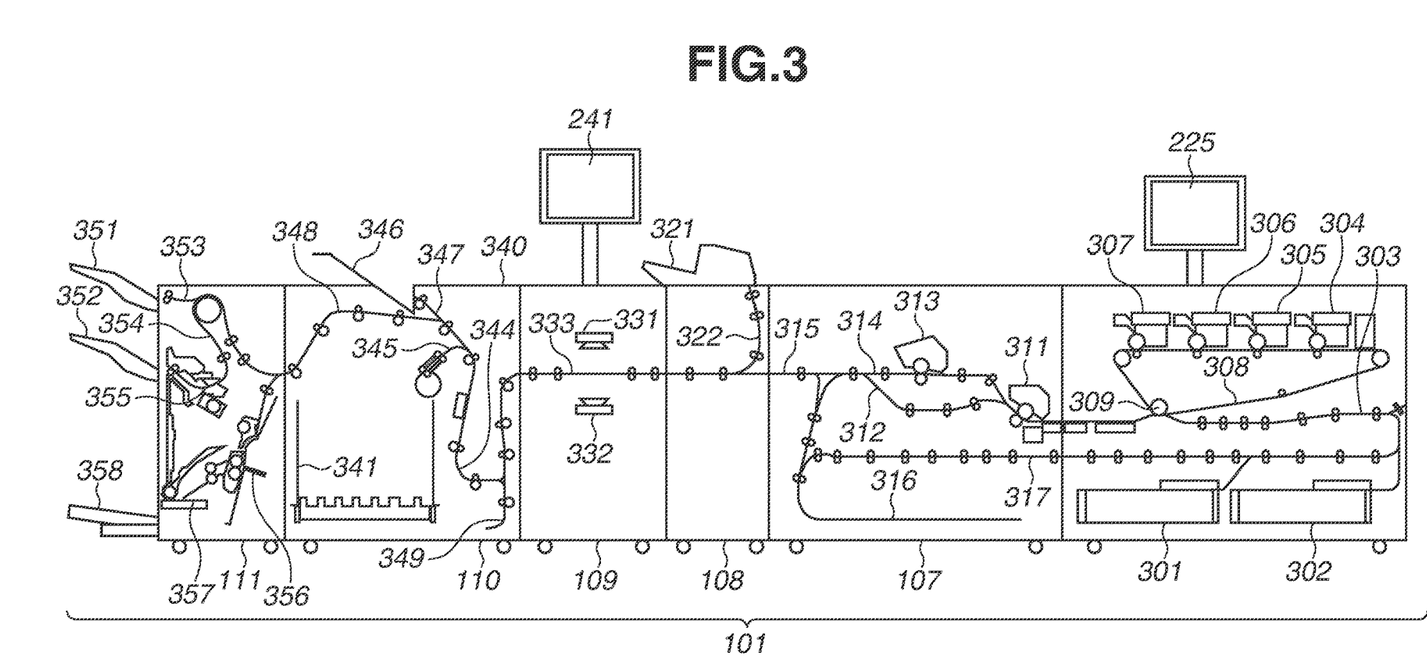
FIG. 3 is a schematic diagram illustrating a mechanical cross section of an image forming apparatus.

FIG. 3 is a diagram illustrating a mechanical cross section of the image forming apparatus 101. The printer 107 forms an image to be printed on a sheet. Paper feed decks 301 and 302 can contain various sheets. In each of the paper feed decks 301 and 302, only the uppermost sheet of the contained sheets can be separated and conveyed to a sheet conveyance path 303. Development stations 304, 305, 306, and 307 form toner images using color toners of Y, M, C, and K, respectively, to form a color image. The toner images formed here are primarily transferred to an intermediate transfer belt 308, the intermediate transfer belt 308 rotates clockwise, and the toner images are transferred to a sheet conveyed from the sheet conveyance path 303 at a secondary transfer position 309. The display 225 displays a printing status and information for settings of the image forming apparatus 101. A fixing unit 311 for fixing toner images to a sheet includes a pressure roller and a heating roller, and fixes the toner images to the sheet by melting and crimping the toners as the sheet passes between the rollers. The sheet having left the fixing unit 311 is conveyed to a conveyance path 315 via a sheet conveyance path 312. Further melting and crimping are desirable for fixing depending on the type of sheet, and in such a case, the sheet is conveyed to the second fixing unit 313 using an upper sheet conveyance path after passing through the fixing unit 311. Upon being subjected to such additional melting and crimping, the sheet is conveyed to the conveyance path 315 via a sheet conveyance path 314. In a case where an image forming mode is a two-sided mode, the sheet is conveyed to a sheet reversing path 316 and reversed in the sheet reversing path 316, and subsequently, the sheet is conveyed to a two-sided conveyance path 317, so that image transfer is performed for the second surface at the secondary transfer position 309.

The inserter 108 for inserting the insertion sheet includes an inserter tray 321, and the sheet is fed from the inserter tray 321 to a sheet conveyance path 322 that joins a path continuous from the conveyance path 315. The sheet can be thereby inserted into the series of sheets conveyed from the printer 107 at an arbitrary point, and then conveyed to the subsequent device.

After passing through the inserter 108, the sheet is conveyed to the verification device 109. The verification device 109 includes CISs 331 and 332 (reading units) facing each other. The CIS 331 is provided to read the front side of a recording sheet, and the CIS 332 is provided to read the back side of the recording sheet. Instead of the CIS, a line scan camera may be used as the image sensor for reading. The verification device 109 reads images of both sides of the recording sheet using the CISs 331 and 332 at the timing when the sheet conveyed to a sheet conveyance path 333 arrives at a predetermined position to determine whether the images are normal. The display unit 241 displays the result of the verification performed by the verification device 109.

In the large capacity stacker 110, a large amount of sheets can be stacked. The large capacity stacker 110 includes a stack tray 341 as a tray for stacking sheets. A sheet passing through the verification device 109 enters the large capacity stacker 110 via a sheet conveyance path 344. The sheet is placed in the stack tray 341 from the sheet conveyance path 344 via a sheet conveyance path 345. The large capacity stacker 340 further includes an escape tray 346 as a sheet discharge tray. The escape tray 346 is used to discharge a sheet determined as a defective sheet by the verification device 109. In a case where a sheet is to be output to the escape tray 346, the sheet is conveyed from the sheet conveyance path 344 to the escape tray 346 via a sheet conveyance path 347. In a case where a sheet is to be conveyed to a post-processing device in a stage following the large capacity stacker 110, the sheet is conveyed via a sheet conveyance path 348. A reversing portion 349 is provided to reverse a sheet. The reversing portion 349 is used in a case where a sheet is to be placed in the stack tray 341. In the case where the sheet is to be placed in the stack tray 341, the sheet is reversed once at the reversing portion 349 so that the orientation of the sheet when entering and that of the sheet when leaving are the same. In a case where a sheet is conveyed to the escape tray 346 or the post-processing device, the reversing operation is not performed because the sheet is directly output without being flipped over when being placed.

The finisher 111 applies finishing processing to the conveyed sheet depending on a function designated by the user. Specifically, the finisher 111 has finishing functions such as stapling (bounding at one position/two positions), punching (forming two holes/three holes), and saddle stitch bookbinding. The finisher 111 includes two sheet discharge trays 351 and 352, and the sheet is output to the sheet discharge tray 351 via a sheet conveyance path 353. The sheet conveyance path 353 is not a path for enabling the finishing processing such as stapling. In a case where the finishing processing such as stapling is performed, a sheet is conveyed to a processing unit 355 via a sheet conveyance path 354 to be processed based on the finishing function designated by the user, and the processed sheets are output to a sheet discharge tray 352. The sheet discharge trays 351 and 352 can each ascend and descend. Therefore, the sheets having been subjected to the finishing processing by the processing unit 355 can also be stacked on the sheet discharge tray 351 by lowering the sheet discharge tray 351. In a case where the saddle stitch bookbinding is designated, the sheets are stapled at the center and folded in half in a saddle stitch processing unit 356, and output to a saddle stitch bookbinding tray 358 via a sheet conveyance path 357. The saddle stitch bookbinding tray 358 has a belt conveyor configuration, and the bound bundle on the saddle stitch bookbinding tray 358 is conveyed to the left side.

The verification device 109 verifies a sheet image printed by the printer 107, based on verification items set beforehand. The sheet image is verified by comparing the correct image set beforehand and the printed sheet image. For the method of comparing the images, there is a method of comparing pixel values for each image position, a method of comparing object positions by edge detection, and a method based on extraction of character data by optical character recognition (OCR). The verification items include printing-position displacement, image hue, image density, streak, blurring, and print omission.

A flow of correct-image registration processing and image verification processing will be described below with reference to FIG. 4 to FIGS. 6A and 6B.

Figure 4:
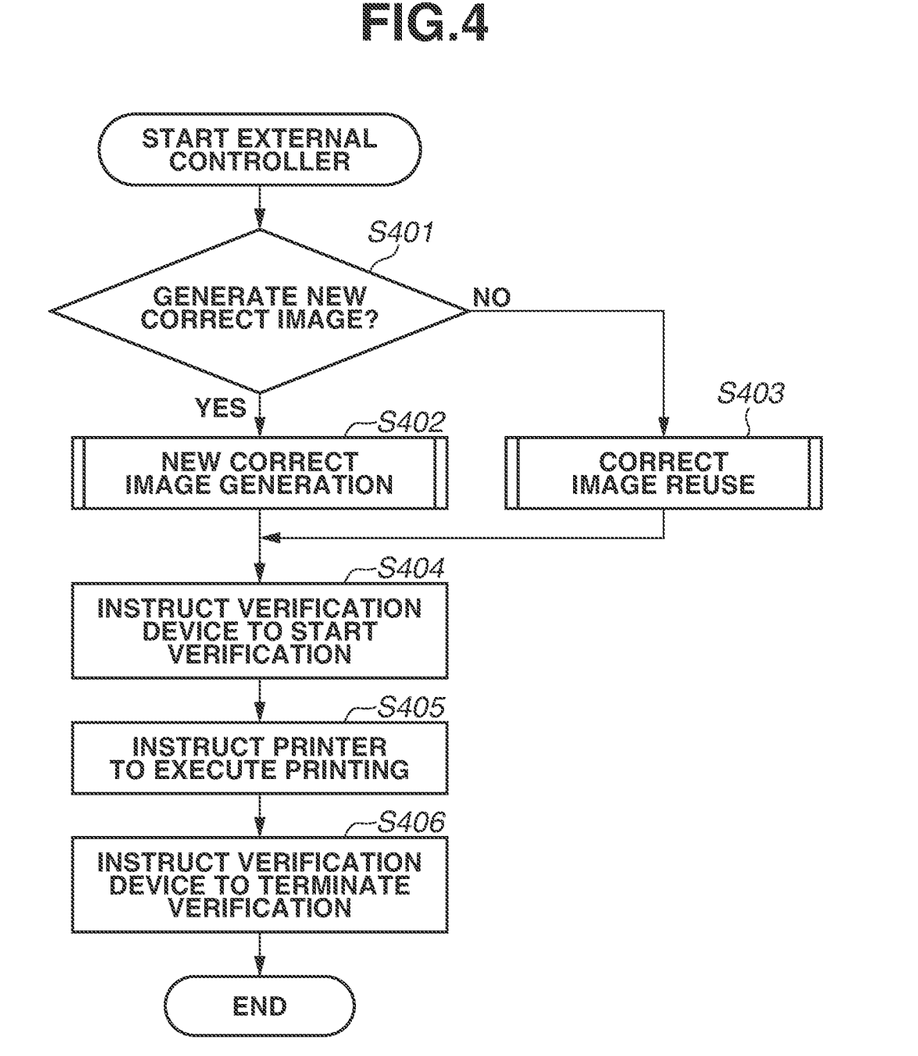
FIG. 4 is a flow of processing by an external controller in setting a correct image.

FIG. 4 is a flowchart illustrating a flow of processing to be performed by the external controller 102 in registering a correct image. A program for executing the processing of the flowchart in FIG. 4 is stored in the HDD 210, and read into the memory 209 to be executed by the CPU 208.

In step S401, the external controller 102 determines whether to generate a new correct image, based on an instruction of the user. If a new correct image is to be generated (YES in step S401), the processing proceeds to step S402. If a new correct image is not to be generated (NO in step S401) and an existing correct image is to be reused, the processing proceeds to step S403. Step S402 and step S403 will be described below.

In step S404, the external controller 102 instructs the verification device 109 to start verification processing using the correct image determined in step S402 or step S403. The details of this verification processing will be described below. In step S405, the external controller 102 inputs a print job into the printer 107 and instructs the printer 107 to execute printing. The print job received by the printer 107 includes information indicating a sheet feeding source and a sheet discharge destination in addition to image data to be printed. The printer 107 controls printed-sheet conveyance in the inserter 108, the verification device 109, the large capacity stacker 110, and the finisher 111, based on the content of the job received from the external controller 102. In step S406, an instruction is given to the verification device 109 to terminate verification.

Figure 5A:
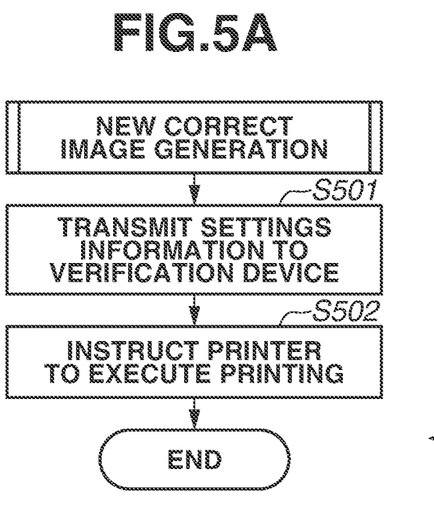
FIGS. 5A and 5B are flowcharts illustrating a flow of processing by the external controller and a flow of processing by a verification device, respectively, in registering a new correct image.
Figure 5B:
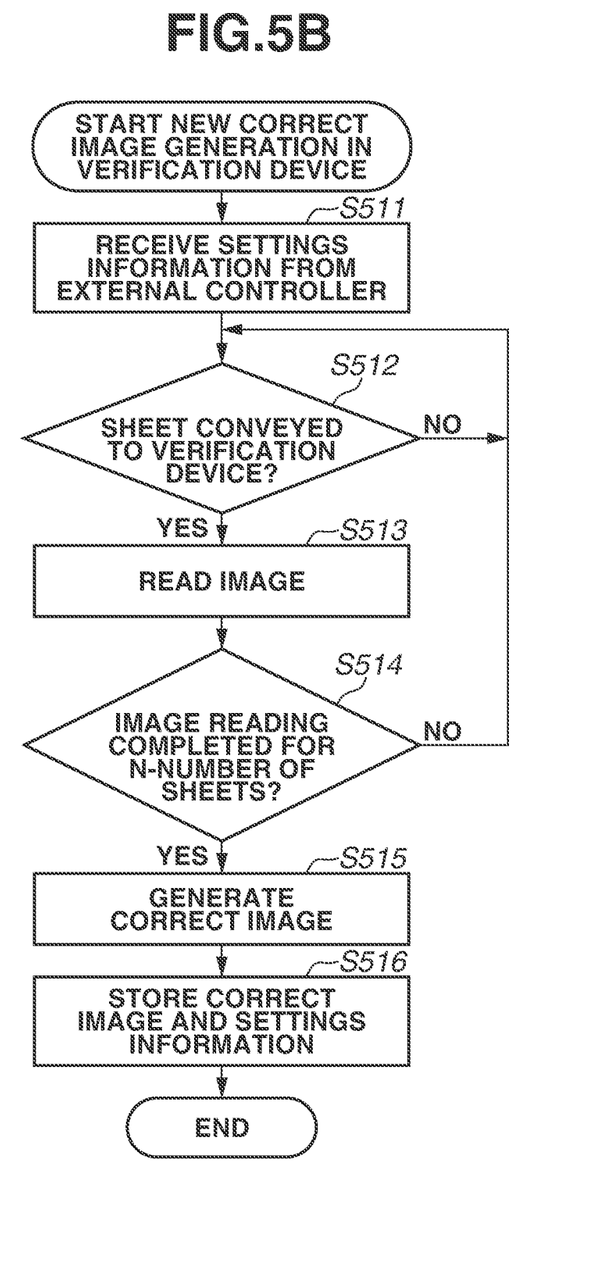

FIGS. 5A and 5B are flowcharts illustrating a flow of processing to be performed by the external controller 102 and a flow of processing to be performed by the verification device 109, respectively, in registering the new correct image in step S402. FIG. 5A illustrates the processing by the external controller 102 in step S402, and FIG. 5B illustrates the processing by the verification device 109.

The CPU 208 of the external controller 102 executes the processing in FIG. 5A, and the CPU 238 of the verification device 109 executes the processing in FIG. 5B. A program for executing the processing of the flowchart in FIG. 5A is stored in the HDD 210, and read into the memory 209 to be executed by the CPU 208. A program for executing the processing of the flowchart in FIG. 5B is stored in the HDD 255, and read into the memory 239 to be executed by the CPU 238.

In FIG. 5A, in step S501, the external controller 102 transmits various settings information to be described below of a print job and information about correct image generation to the verification device 109. The various settings information (print settings) of the print job will be described below with reference to FIG. 7. The information about correct image generation includes information indicating the number of sheets per copy and a surface to be verified, and further, how many images per sheet is to be averaged to generate a correct image.

Next, in step S502, the external controller 102 instructs the printer 107 to execute printing, in order for the verification device 109 to read an image as a correct image, and this flow ends.

In FIG. 5B, in step S511, the verification device 109 receives the information about correct image generation in addition to the various settings information of the print job from the external controller 102. Next, in step S512, the verification device 109 waits for a sheet to be conveyed to the verification device 109.

If the sheet is conveyed (YES in step S512), the processing proceeds to step S513. In step S513, the verification device 109 reads an image of the sheet using each of the CIS 331 and the CIS 332 and stores the read image in the memory 239 of the verification device 109.

In step S514, the verification device 109 determines whether image reading is completed for the number of sheets indicated by the information acquired in step S511. If the image reading is not completed for the number of sheets (NO in step S514), the processing returns to step S512. If the image reading is completed for the number of sheets (YES in step S514), the processing proceeds step S515. In step S515, the verification device 109 generates a correct image by averaging the read images. Next, in step S516, the generated correct image and the various settings information (print settings) of the print job are stored in association with each other in the HDD 255, and this flowchart ends.

In the present exemplary embodiment, the correct image and the various settings information of the print job are stored in the HDD 255 of the verification device 109, but the storage destination may be the HDD 221 of the printer 107 or the HDD 210 of the external controller 102.

Figure 6A:
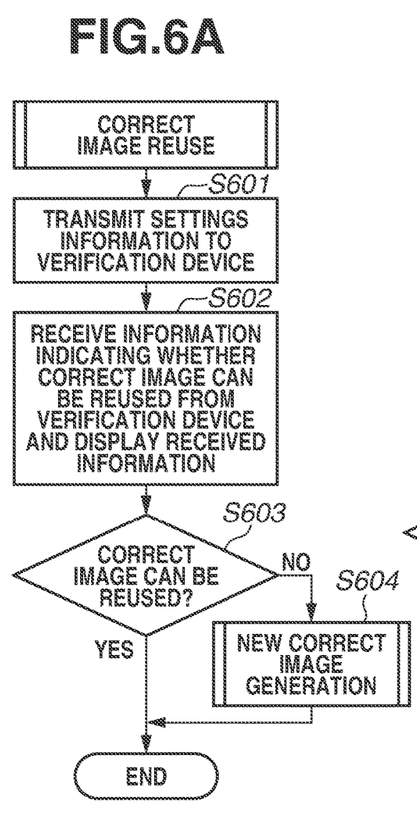
FIGS. 6A and 6B are flowcharts illustrating a flow of processing by the external controller and a flow of processing by the verification device, respectively, in reusing a correct image.
Figure 6B:
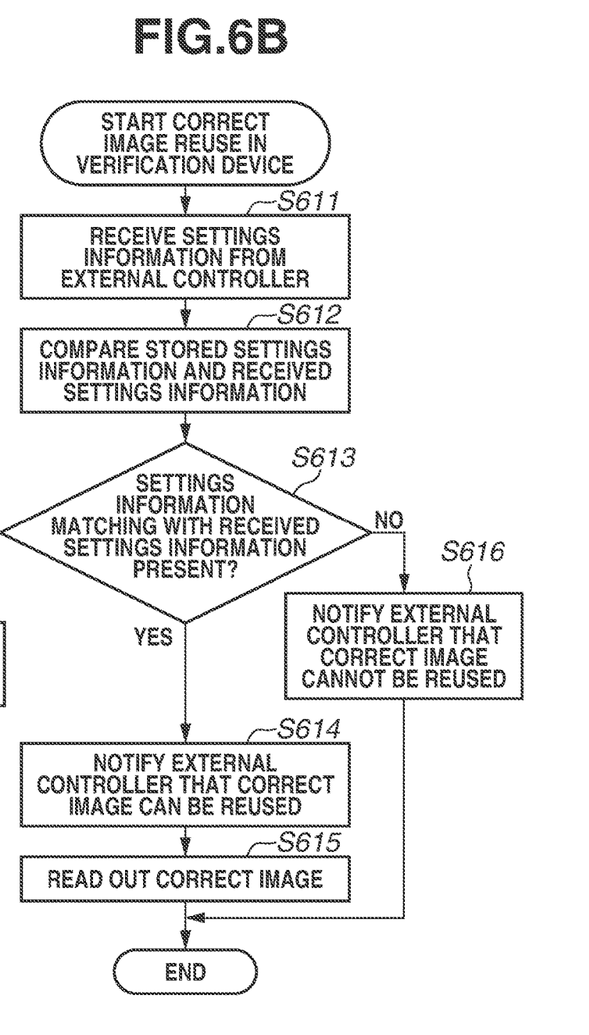

FIGS. 6A and 6B are flowcharts illustrating a flow of processing to be performed by the external controller 102 and a flow of processing to be performed by the verification device 109, respectively, in reusing the correct image in step S403. FIG. 6A illustrates the processing by the external controller 102 in step S403, and FIG. 6B illustrates the processing by the verification device 109. The CPU 208 of the external controller 102 executes the processing in FIG. 6A, and the CPU 238 of the verification device 109 executes the processing in FIG. 6B. A program for executing the processing of the flowchart in FIG. 6A is stored in the HDD 210, and read into the memory 209 to be executed by the CPU 208. A program for executing the processing of the flowchart in FIG. 6B is stored in the HDD 255, and read into the memory 239 to be executed by the CPU 238.

In FIG. 6A, in step S601, the external controller 102 transmits the various settings information to be described below of the print job to the verification device 109. Next, in step S602, the external controller 102 receives information indicating whether the correct image can be reused from the verification device 109 and displays the received information on the display 212 of the external controller 102.

In step S603, the external controller 102 determines whether the correct image can be reused. If the correct image can be reused (YES in step S603), this flow ends. If the correct image cannot be reused (NO in step S603), the processing proceeds to step S604. In step S604, the external controller 102 generates a new correct image, and this flow ends. This new correct-image generation processing in step S604 is similar to the processing described with reference to FIG. 5A.

In the present exemplary embodiment, the information indicating whether the correct image can be reused may be notified to the user by being displayed on the display unit 241 of the verification device 109 or the display 225 of the printer 107 in step S602. Alternatively, there may be adopted such a configuration that whether to generate a new correct image is selected by the user after the information indicating whether the correct image can be reused is notified to the user in step S602.

In FIG. 6B, in step S611, the verification device 109 receives the various settings information of the print job of a verification target, from the external controller 102. Next, in step S612, the verification device 109 compares settings information stored in the HDD 255 and the settings information received in step S611. Subsequently, in step S613, the verification device 109 determines whether settings information matching with the settings information received in step S611 is held in the HDD 255 by making a comparison. If settings information matching with the received settings information is held in the HDD 255 (YES in step S613), the processing proceeds to step S614. In step S614, the verification device 109 notifies the external controller 102 that the correct image can be reused. Next, in step S615, the verification device 109 reads out a correct image corresponding to the settings information received in step S611 from the HDD 255 and this flow ends. If settings information matching with the received settings information is not held in the HDD 255 (NO in step S613), the processing proceeds to step S616. In step S616, the verification device 109 notifies the external controller 102 that the correct image cannot be reused and this flow ends. In a case where the correct image cannot be reused, the verification device 109 performs the new correct-image generation processing described with reference to FIG. 5B, in conjunction with the processing in step S604 by the external controller 102, after this flowchart ends.

Figure 7:
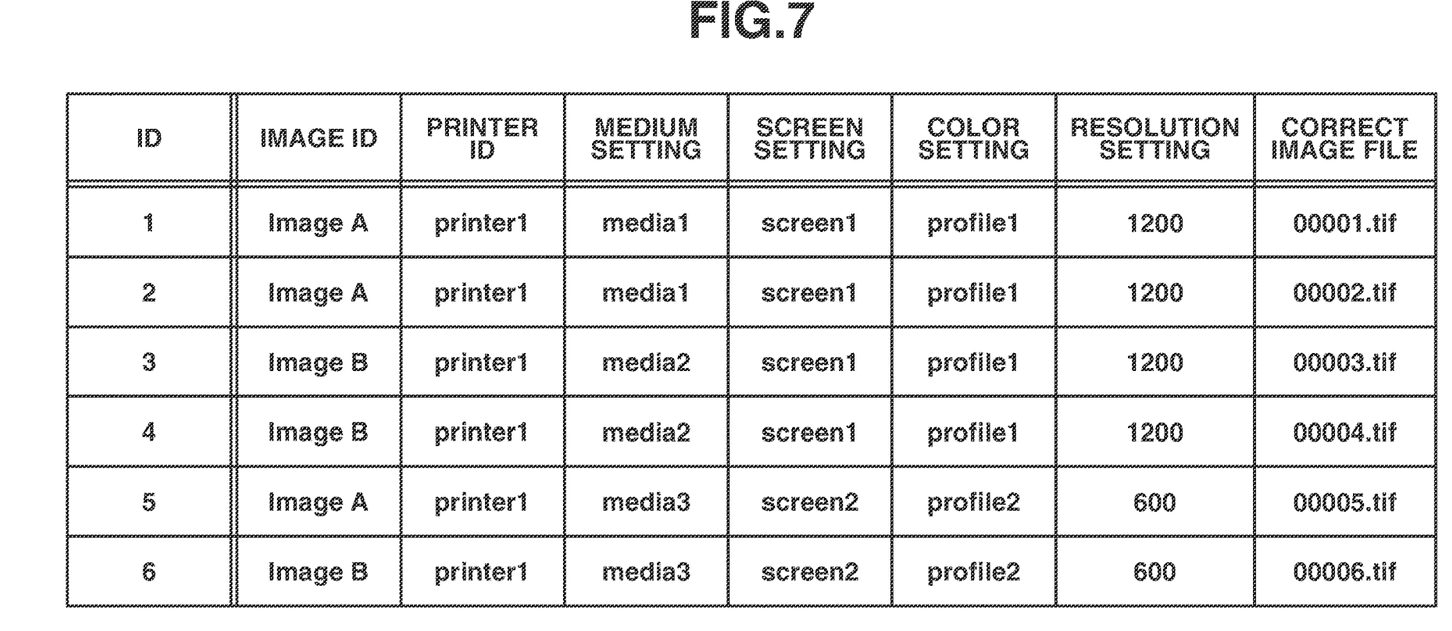
FIG. 7 illustrates a management table for correct images and settings information.

FIG. 7 illustrates a management table for managing various settings information of a print job and a correct image held in association with each other in the HDD 255.

Each element of the management table has an identification (ID). Each element has an image ID, a printer ID, a medium setting, a screen setting, a color setting, and a resolution setting, as the various settings information of the print job. Each element further has a correct image file associated with the various settings information. The settings of the various settings information in the management table will be described in order.

The image ID is information for identifying an image to be printed. Information such as attribute information including a file name, the number of pages, and the size of input data for the external controller 102 can be used as the image ID. Further, a thumbnail image formed by reducing the input data or a copy of the input data may be directly used. This enables the external controller 102 to identify a correct image corresponding to an image to be printed.

The printer ID is information indicating which printer has printed a candidate for a correct image. A case where the verification device 109 is connected to another printer is taken into consideration. In addition to the model name of a printer, information such as a serial number for uniquely identifying the printer may be used as the printer ID. A correct image can be thereby properly selected even when the print image accuracy varies due to a difference between printer models.

The medium setting is information indicating a paper type to be used for a printed sheet. Information such as a basis weight (thick paper, plain paper, or thin paper) or a category (glossy paper or plain paper) is used as the information indicating the paper type. A correct image can be thereby selected properly even when the print image accuracy varies due to a difference between medium types.

The screen setting is information indicating a screen to be used in generating a halftone image in halftone processing from image data input into the external controller 102. A screen name that can be used by the external controller 102 is used as the screen setting. A correct image can be thereby selected properly even when the screen in use is changed in consideration of the print image quality.

The color setting is information indicating a color profile in rendering the image data input into the external controller 102 into a halftone image. A color profile name that can be used by the external controller 102 is used as the color setting. A correct image can be thereby selected properly even when the color profile in use is changed in consideration of the print image quality.

The resolution setting is information indicating a resolution in rendering the image data input into the external controller 102 into a halftone image. A resolution such as 1200 dpi or 600 dpi is used as the resolution setting. A correct image can be thereby selected properly even when the resolution is changed.

The correct image file is associated with these settings of the various settings information. In step S612, the verification device 109 compares the various settings information held in the HDD 255 and the various settings information received from the external controller 102. As a result of the comparison, the correct image file corresponding to the matching various settings information is selected.

The various settings information described in the present exemplary embodiment is an example, and can include other settings if these settings are related to the print image accuracy. For example, if there is an image processing setting unique to the printer 107, information indicating this setting can be included. In addition, not all of the settings information may be used, and settings information having an ignorable effect may be excluded depending on the reading performance of the imaging unit 240 of the verification device 109. Alternatively, there may be adopted such a configuration that each item of the settings information is given a changeable weight and a correct image corresponding to the sum exceeding a fixed value is selected.

In a case where a plurality of correct images corresponding to the matching settings information is present, the correct image may be automatically selected based on the ID order, i.e., the order in which the correct images are generated, or an inquiry may be made to the user.

Figure 8:
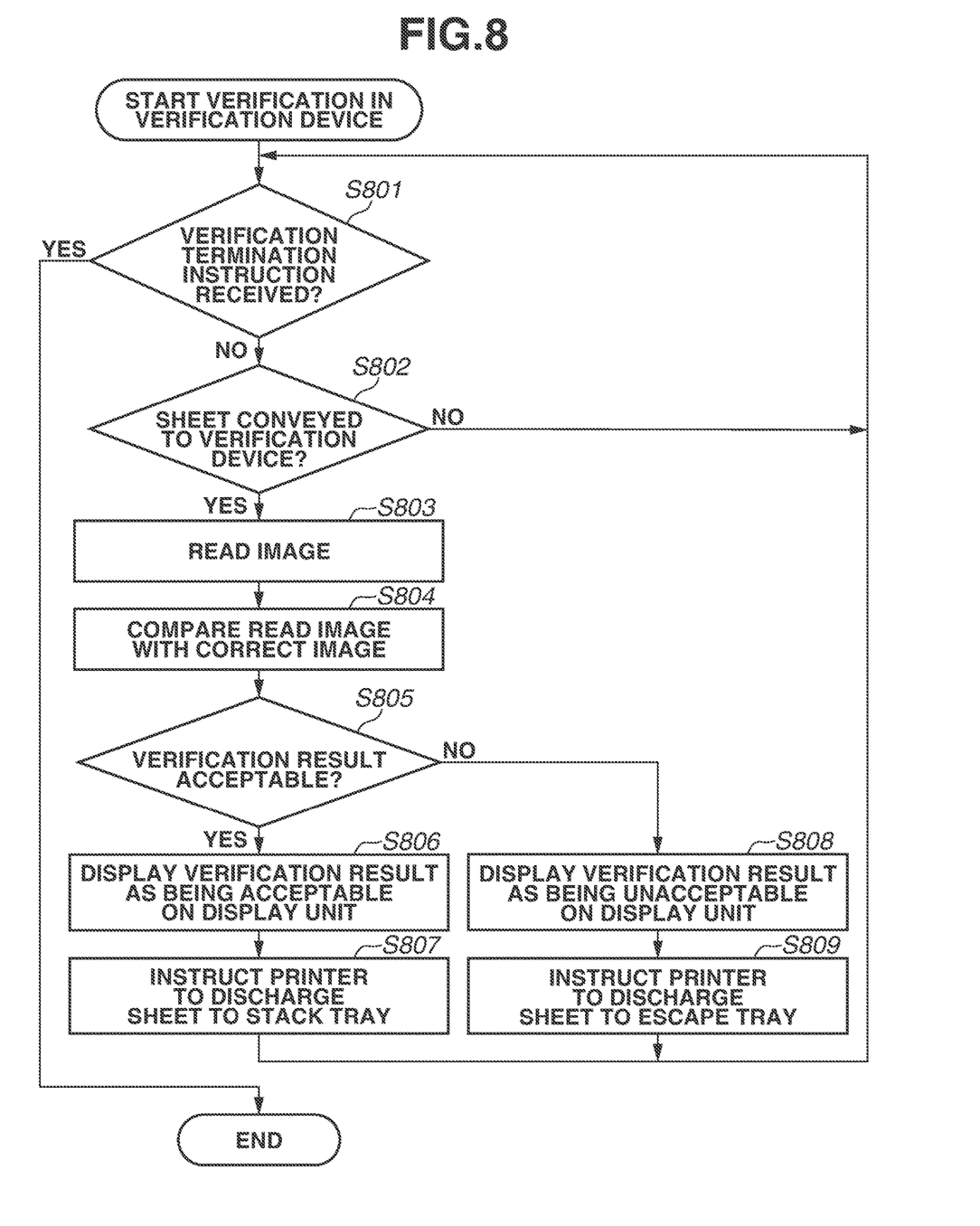
FIG. 8 is a flow of processing by the verification device in performing verification processing.

FIG. 8 is a flowchart illustrating a flow of processing to be performed by the verification device 109 in the verification processing. The CPU 238 of the verification device 109 executes the processing in FIG. 8. A program for executing the processing of the flowchart in FIG. 8 is stored in the HDD 255, and read into the memory 239 to be executed by the CPU 238.

In step S801, the verification device 109 determines whether a verification termination instruction is received. If the verification termination instruction is received (YES in step S801), the processing of the verification device 109 ends. If the verification termination instruction is not received (NO in step S801), the processing proceeds to step S802. In step S802, the verification device 109 determines whether a sheet is conveyed to the verification device 109. If the sheet is not conveyed (NO in step S802), the processing returns to step S801.

If the sheet is conveyed (YES in step S802), the processing proceeds to step S803. In step S803, the verification device 109 reads an image of the sheet using the CIS 331 and the CIS 332 and stores the read image in the memory 239 of the verification device 109.

In step S804, the verification device 109 compares the image read in step S803 with a correct image. The correct image used here is the correct image generated in FIG. 5B or the correct image reused in FIG. 6B. Next, in step S805, the verification device 109 determines whether the read image is a normal image or a defective image (i.e., whether the verification result is acceptable), based on the result of the comparison with the correct image in step S804.

If the verification device 109 determines that the read image is a normal image, i.e., the verification result is acceptable (YES in step S805), the processing proceeds to step S806. In step S806, and the verification device 109 displays the verification result as being acceptable on the display unit 241 of the verification device 109. Next, in step S807, the verification device 109 instructs the printer 107 to discharge the printed sheet to the stack tray 341 of the large capacity stacker 110. Based on this instruction from the verification device 109, the printer 107 instructs the large capacity stacker 110 to discharge the sheet to the stack tray 341.

Subsequently, the processing returns to step S801 to continue. If the verification device 109 determines that the read image is a defective image, i.e., the verification result is unacceptable (NO in step S805), the processing proceeds to step S808. In step S808, the verification device 109 displays the verification result as being unacceptable on the display unit 241 of the verification device 109. Next, in step S809, the verification device 109 instructs the printer 107 to discharge the printed sheet to the escape tray 346 of the large capacity stacker 110. Based on this instruction from the verification device 109, the printer 107 instructs the large capacity stacker 110 to discharge the sheet to the escape tray 346. Subsequently, the processing returns to step S801 to continue.

As described above, according to the present exemplary embodiment, the correct image and the various settings information of the print job are managed in association with each other. The correct image can be thereby selected properly when the correct image is reused later even when the setting related to the print image accuracy is changed.

The present exemplary embodiment is an example, and the present exemplary embodiment is not limited to the configuration described above. The processing flows of generation and reuse of the correct image described with reference to FIG. 4 to FIGS. 6A and 6B of the present exemplary embodiment are performed by the external controller 102 and the verification device 109, but may be performed by the printer 107 and the verification device 109, in a form in which the external controller 102 is not connected. Alternatively, all of the processing in these flows may be performed in the verification device 109. In this case, the verification device 109 inquires of the external controller 102 or the printer 107 about the settings information of a print job whenever appropriate. In a case where such a configuration is adopted, the external controller 102 is configured to respond only when receiving an inquiry about the settings information from the verification device 109.

In the present exemplary embodiment, the verification device 109 is configured to automatically select the most appropriate correct image, based on the settings information received from the external controller 102. However, the verification device 109 may be configured to present the table including the correct images and the settings information described with reference to FIG. 7 to the user, and the user selects a correct image. In a case where such a configuration is adopted, if the settings information of the correct image selected by the user does not match with the settings information received from the external controller 102, the external controller 102 can display a warning and entrust the user with determination as to whether to generate a new correct image.

According to the present exemplary embodiment, a printed sheet of a verification target image with no image defect can be prevented from being erroneously detected as a sheet having an image defect.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-235092, filed Dec. 25, 2019, which is hereby incorporated by reference herein in its entirety.

What is claimed is:

1. An inspection apparatus comprising:
   a registration unit configured to register one or more reference images generated by reading one or more images printed on one or more recording sheets, the one or more reference images being associated respectively with first print settings used in printing the one or more reference images;
   a selection unit configured to select a reference image among the one or more reference images registered by the registration unit, based on second print settings of an inspection target image printed on the recording sheet, the second print settings matching the first print settings; and
   a determination unit configured to determine if the inspection target image is normal or defective, based on the inspection target image and the reference image selected by the selection unit.

2. The inspection apparatus according to claim 1, wherein at least one of the first and second print settings include one or more pieces of information representing paper used in printing the image and information representing image processing executed to print the image.

3. The inspection apparatus according to claim 1, wherein the selection unit selects the reference image registered by the registration unit, based on the first and second print settings.

4. The inspection apparatus according to claim 1, wherein the selection unit selects the reference image associated with at least one of the first print settings matching at least one of the second print settings of the inspection target image.

5. The inspection apparatus according to claim 1, wherein the selection unit selects the reference image having the first print setting matching partially or wholly the second print settings.

6. The inspection apparatus according to claim 1, further comprising a notification unit configured to issue a notification that prompts registration of a reference image in a case where a reference image associated with the first print settings matching the second print settings of the inspection target image is not registered.

7. The inspection apparatus according to claim 1, wherein the selection unit selects the reference image registered by the registration unit, further, based on content of the inspection target image.

8. The inspection apparatus according to claim 2, wherein the information representing the image processing includes one or more of information representing a screen used in halftone processing, information representing a color profile used in the image processing, and information representing a resolution of the image.

9. The inspection apparatus according to claim 1, wherein the reference image is generated as a new reference image or a reused reference image based on a user's instruction.

10. The inspection apparatus according to claim 1, wherein the new reference image is generated as an average image of a plurality of target images.

11. The inspection apparatus according to claim 1, wherein the reused reference image is taken as a previously stored reference image.

12. The inspection apparatus according to claim 1, wherein the determination unit is further configured to display an inspection result on a display screen.

13. The inspection apparatus according to claim 12, wherein the inspection result is acceptable if the read inspection target image is normal and the inspection result is unacceptable if the read inspection target image is defective.

14. The inspection apparatus according to claim 1, wherein one of the first and second print settings include at least one of an image ID, a printer ID, a medium setting, a screen setting, a color setting, and a resolution setting.

15. An inspection method comprising:
registering one or more reference images generated by reading one or more images printed on one or more recording sheets, the one or more reference images being associated respectively with first print settings used in printing the one or more reference images;
selecting a reference image among the registered one or more reference images, based on second print settings of an inspection target image printed on a recording sheet, the second print settings matching the first print settings; and
determining if the inspection target image is normal or defective, based on the inspection target image and the selected reference image.

16. An image forming system comprising:
a printing unit configured to print an image on a recording sheet;
a reading unit configured to read the image printed on the recording sheet by the printing unit;
a registration unit configured to register one or more reference images generated by reading one or more images printed on one or more recording sheets, the one or more reference images being associated respectively with first print settings used in printing the one or more reference images;
a selection unit configured to select a reference image among the one or more reference images registered by the registration unit, based on second print settings of an inspection target image printed on the recording sheet, the second print settings matching the first print settings; and
a determination unit configured to determine if the inspection target image is normal or defective, based on the inspection target image and the reference image selected by the selection unit.

17. An inspection apparatus comprising:
a registration unit configured to register a plurality of reference images generated by reading a plurality of images printed on a plurality of recording sheets, a first reference image of the plurality of reference images being associated with first print setting used in the printing and a second reference image of the plurality of reference images being associated with second print setting used in the printing;
a selection unit configured to select, among the plurality of reference images registered by the registration unit, a reference image which has a print setting matching a print setting of an inspection target image generated by reading a target image printed on a recording sheet; and
a determination unit configured to determine if the inspection target image is normal or defective, based on the inspection target image and the reference image selected by the selection unit.

18. The inspection apparatus according to claim 17, wherein the first print setting includes one or more of a screen used in halftone processing of the reference image, a color profile used in an image processing, and a resolution of the first reference image.

19. The inspection apparatus according to claim 17, wherein the first print setting includes information about a recording sheet on which an image is printed.

* * * * *